United States Patent [19]

Inoue et al.

[11] Patent Number: 4,963,645

[45] Date of Patent: Oct. 16, 1990

[54] TERMINAL-MODIFIED IMIDE OLIGOMER AND SOLUTION COMPOSITION OF THE SAME

[75] Inventors: Hiroshi Inoue; Tadao Muramatsu; Tetsuji Hirano, all of Hirakata, Japan

[73] Assignee: Ube Industries, Ltd., Ube, Japan

[21] Appl. No.: 236,000

[22] Filed: Aug. 24, 1988

[30] Foreign Application Priority Data

Aug. 25, 1987 [JP] Japan ............................ 62-209341
Aug. 25, 1987 [JP] Japan ............................ 62-209342

[51] Int. Cl.$^5$ ................. C08G 69/26; C08G 63/00; C08G 2/00; C08G 12/00
[52] U.S. Cl. ............................ 528/342; 528/179; 528/182; 528/188; 528/222; 528/224; 528/229; 528/352; 528/353
[58] Field of Search ............ 528/342, 179, 182, 188, 528/222, 224, 229, 352, 353

[56] References Cited

U.S. PATENT DOCUMENTS

| | | | |
|---|---|---|---|
| 4,061,856 | 12/1977 | Hsu | 528/342 |
| 4,159,262 | 6/1979 | Hsu | 528/342 |
| 4,173,700 | 11/1979 | Green | 528/342 |

Primary Examiner—John Kight, III
Assistant Examiner—T. Mosley
Attorney, Agent, or Firm—Frishauf, Holtz, Goodman & Woodward

[57] ABSTRACT

A terminal-modified imide oligomer having an unsaturated group as a terminal group and an imide bond inside of the oligomer which is produced by reacting 2,3,3',4'-or 3,3',4,4'-biphenyltetracarboxylic acid or its derivative, a diamine compound, and an unsaturated dicarboxylic acid or its derivative and/or an unsaturated monoamine in an organic solvent is disclosed. This oligomer has a logarithmic viscosity of not more than 1.0. This logarithmic viscosity is measured under the conditions of concentration of 0.5 g/100 ml-solvent (N-methyl-2-pyrrolidone) and a temperature of 30° C., and has a melting point of 50° to 300° C.

42 Claims, No Drawings

TERMINAL-MODIFIED IMIDE OLIGOMER AND SOLUTION COMPOSITION OF THE SAME

BACKGROUND OF THE INVENTION

1. Field of the Invention

This invention relates to a specific terminal-modified imide oligomer which is soluble in various organic polar solvents, has a relatively low melting point and further has a terminal group (i.e., end group) capable of undergoing addition polymerization (i.e., cross-linking reaction) and an imide main chain bond, and a solution composition of said oligomer.

The terminal-modified imide oligomer or the solution composition of the oligomer can be widely employed, for example, as a matrix resin which is used for the preparation of a composite material containing a variety of fillers, reinforcing agents and heat-resistant adhesives for adhering various materials, or a starting material for the preparation of various heat-cured products. The products obtained by curing the imide oligomer of the invention are prominently high in heat resistance.

2. Description of Prior Art

Polyimide resins of a low molecular weight have been heretofore employed as matrix resins of various molded products or fiber-reinforced composite materials, because they show high heat resistance.

However, the known polyimide resins (specifically, aromatic polyimides) are generally low in solubility in organic solvents, so that they have been used in the form of a solution of polyamic acid, that is a polyimide precursor, for various purposes. Since the polyamic acid is a condensation polymer, there arise various problems for removing gases such as water (i.e., reaction water) which is produced in the curing process of a polymer in the preparation of products.

In view of those problems, there has been recently proposed, for example, a polyimide resin of addition type having an unsaturated terminal group (i.e., end group) which is produced by a reaction of (a) an aromatic tetracarboxylic dianhydride such as pyromellitic dianhydride and benzophenonetetracarboxylic dianhydride, (b) an aromatic diamine and (c) an unsaturated reactive compound, as described in Japanese Patent Provisional Publications No. 59(1984)-167569, No. 60(1985)-250030, No. 60(1985)-260624, No. 60(1985)-260625, No. 61(1986)-247733, No. 62(1987)-29584, etc.

However, the above-mentioned known polyimide resins also have various drawbacks. For example, a specific diamine compound which is expensive and not easily obtainable should be used in the preparation of the polyimide resins, or the resulting polymer is not always high in solubility in an organic solvent. Otherwise, a specific organic solvent having a high boiling point is required in the preparation of a polyimide solution. In addition, a melting point of the obtained polyimide resin becomes too high, whereby the quality of a product deteriorates in the preparation from the polyimide resin.

More specifically, when a solution which contains a polyimide of high melting point in a low concentration is impregnated into reinforced fibers to produce a composite material, the impregnation of the solution into the reinforced fibers should be repeated several times to obtain the desired resin content, or the molding process should be carried out at an elevated temperature. Further, when a polyimide solution obtained by utilizing the aforementioned known solvent of a high boiling point is used as an adhesive, it is difficult to completely evaporate the high-boiling solvent, and as a result, the polyimide solution is unsuitable for practical use because it shows poor adhesiveness.

SUMMARY OF THE INVENTION

The object of the present invention is to newly provide an imide oligomer of an aromatic tetracarboxylic acid type which is capable of undergoing addition polymerization, is free from the above-described various problems, has a high solubility in a solvent and a low melting point, and is widely employable in practical use, and a solution composition of said imide oligomer.

The present invention provides a terminal-modified imide oligomer which is characterized in that:

said oligomer is produced by reacting an aromatic tetracarboxylic acid or its derivative containing at least 50 molar % of 2,3,3',4'-biphenyltetracarboxylic acid or its derivative, a diamine compound, and an unsaturated dicarboxylic acid or its derivative or an unsaturated monoamine in an organic solvent;

said oligomer has an unsaturated group as a terminal group and an imide bond inside of the oligomer; and said oligomer has a logarithmic viscosity of not more than 1.0, said logarithmic viscosity being measured under the conditions of a concentration of 0.5 g/100 ml-solvent, a solvent of N-methyl-2-pyrrolidone and a temperature of 30° C., and has a melting point of 50° to 300° C.

The present invention also provides a terminal-modified imide oligomer which is characterized in that:

said oligomer is produced by reacting an aromatic tetracarboxylic acid or its derivative containing at least 50 molar % of 3,3',4,4'-biphenyltetracarboxylic acid or its derivative, a diamine compound, and an unsaturated dicarboxylic acid or its derivative or an unsaturated monoamine in an organic solvent;

said diamine compound is selected from the group consisting of trialkylbenzene diamines, bis(phenoxy)-benzene diamines, diphenylalkane diamines, bis(-phenoxy)propane diamines, bis[(phenoxy)phenyl]propane diamines, diphenylsulfone diamines and bis(-phenoxy)diphenylsulfone diamines;

said oligomer has an unsaturated group as a terminal group and an imide bond inside of the oligomer; and said oligomer has a logarithmic viscosity of not more than 1.0, said logarithmic viscosity being measured under the conditions of a concentration of 0.5 g/100 ml-solvent, a solvent of N-methyl-2-pyrrolidone and a temperature of 30° C., and has a melting point of 50° to 300° C.

The present invention further provides a terminal-modified imide oligomer solution composition containing the above-identified terminal-modified imide oligomer in a concentration 3 to 80 wt. % homogeneously dissolved in an organic polar solvent.

DETAILED DESCRIPTION OF THE INVENTION

The terminal-modified imide oligomer of the present invention is very excellent in solubility, and hence it can be dissolved in a variety of organic polar solvents in a high concentration. Further, since the melting point is relatively low, the imide oligomer is very suitable for various usage. Moreover, the molded products obtained by heat-curing the terminal-modified imide oligomer also show high heat resistance.

The terminal-modified imide oligomer solution composition of the present invention employs the imide oligomer which has prominently high solubility as described above, so that the solution composition is very stable. Further, the solution composition can be suitably used as an adhesive or the like because the above-mentioned imide oligomer has excellent physical properties.

As is described above, the terminal-modified imide oligomer of the invention is classified into two groups: one terminal-modified imide oligomer originating from 2,3,3',4'-biphenyltetracarboxylic acid or its derivative such as its acid dianhydride, namely, asymmetric type compound, and another terminal-modified imide oligomer originating from 3,3,4,4'-biphenyltetracarboxylic acid or its derivative such as its acid dianhydride, namely, symmetric type compound.

In the first place, the former imide oligomer originating from the asymmetric type compound is described.

The terminal-modified imide oligomer of the invention is an imide oligomer obtained by reacting 2,3,3',4'-biphenyltetracarboxylic acid or its derivative, a diamine compound, and an unsaturated dicarboxylic acid or its derivative and/or an unsaturated monoamine in an organic solvent in such a manner that the total number of acid anhydride groups or pairs of neighbouring acid groups (including its esters, etc.) of all components are essentially equal to the total number of amino groups of all components, and has an acetylene or ethylene unsaturated terminal group (i.e., end group) which is polymerizable in addition reaction and a number of imide bonds inside (in main chain) thereof. Further, the terminal-modified imide oligomer of the invention has a logarithmic viscosity of not more than 1.0, preferably in the range of approx. 0.01 to 0.8, more preferably in the range of approx. 0.03 to 0.7, that is, the imide oligomer has a relatively low molecular weight. The melting point of the terminal-modified imide oligomer is in the range of 50° to 300° C., preferably in the range of 60° to 260° C., and the imide oligomer is in the solid (particulate) state at room temperature (20° C.).

Examples of the aforementioned 2,3,3',4'-biphenyltetracarboxylic acid and its derivative include 2,3,3'4'-biphenyltetracarboxylic acid, 2,3,3',4'-biphenyltetracarboxylic dianhydride (a-BPDA), and their derivatives such as lower alcohol esters thereof and salts thereof. Particularly preferred is 2,3,3',4'-biphenyltetracarboxylic dianhydride.

In the aromatic tetracarboxylic acid or its derivative, at least 50 molar %, preferably at least 70 molar %, more preferably at least 75 molar %, of 2,3,3',4'-biphenyltetracarboxylic acid of its derivative is contained. In other words, the above-mentioned 2,3,3',4'-biphenyltetracarboxylic acid or its derivative can be partially (not more than 50 molar %, preferably not more than 30 molar %, more preferably not more than 25 molar %) substituted by other aromatic tetracarboxylic acids or their derivatives such as 3,3',4,4'-biphenyltetracarboxylic dianhydride (s-BPDA), 3,3',4,4'-benzophenonetetracarboxylic dianhydride (BTDA), pyromellitic dianhydride (PMDA), 2,2-bis(3,4-dicarboxyphenyl)propane dianhydride, bis(3,4-dicarboxyphenyl)methane dianhydride, bis(3,4-dicarboxyphenyl)ether dianhydride, bis(3,4-dicarboxyphenyl)thioether dianhydride, bid(3,4-dicarboxyphenyl)phosphine dianhydride and bis(3,4-dicarboxyphenyl)sulfone dianhydride, or aliphatic tetracarboxylic acids such as butanetetracarboxylic dianhydride.

Examples of the aforementioned diamine compound are as follows:

(i) benzene diamines (phenylenediamines) such as 1,4-diaminobenzene, 1,3-diaminobenzene (m-phenylenediamine: MPD), 1,2-diaminobenzene, 2,6-diethyl-1,3-diaminobenzene and 4,6-diethyl-2-methyl-1,3-diaminobenzene;

(ii) toluene diamines such as 3,5-diethyltoluene-2,4-diamine (2,4-DETDA) and 3,5-diethyltoluene-2,6-diamine (2,6-DETDA);

(iii) xylylene diamines such as m-xylylenediamine and p-xylylenediamine;

(iv) diphenyl(thio)ether diamines such as 4,4'-diaminodiphenyl ether (DADE), 3,4'-diaminodiphenyl ether, 3,3'-diaminodiphenyl ether and 4,4'-diaminodiphenyl thioether;

(v) benzophenone diamines such as 3,3'-diaminobenzophenone and 4,4'-diaminobenzophenone;

(vi) diphenylphosphine diamines such as 3,3'-diaminodiphenylphosphine and 4,4'-diaminodiphenylphosphine;

(vii) diphenylsulfide diamines such as 3,3'-diaminodiphenylsulfide and 4,4'-diaminodiphenylsulfide;

(viii) diphenylsulfone diamines such as 3,3-diaminodiphenylsulfone (3,3'-DDS) and 4,4'-diaminodiphenylsulfone;

(ix) diphenylmethane diamines such as 3,3'-diaminodiphenylmethane, 4,4'-diaminodiphenylmethane (DADM), bis(2,6-diethyl-4-aminophenyl)methane, 4,4'-methylene-bis(2,6-diethylaniline) (M-DEA), bis(2-ethyl-6-methyl-4-aminophenyl)methane and 4,4'-methylene-bis(2-ethyl-6-methylaniline) (M-MEA);

(x) bis(phenyl)propane diamines such as 2,2-bis(3-aminophenyl)propane, 2,2-bis(4-aminophenyl)propane, 2,2-bis(3-chloro-4-aminophenyl)propane and 2,2-bis(3-amino-4-hydroxyphenyl)hexafluoropropane (BHFP);

(xi) bis(phenoxy)diphenylsufone diamines such as 4,4'-bis(4-aminophenoxy)diphenylsulfone, bis[4-(4-aminophenoxy)phenyl]sulfone (4-BAPS), 4,4'-bis(3-aminophenoxy)diphenylsulfone and bis[4-(3-aminophenoxy)phenyl]sulfone (3-BAPS);

(xii) benzidines such as benzidine and 3,3'-dimethylbenzidine (o-TN);

(xiii) bis(phenoxy)benzene diamines such as 1,3-bis(4-aminophenoxy)benzene (TPE-R), 1,3-bis(3-aminophenoxy)benzene, 1,4-bis(4-aminophenoxy)benzene (TPE-Q) and 1,3-bis(4-aminophenoxy)benzene;

(xiv) bis(phenoxy)propane diamines such as 2,2-bis(4-aminophenoxy)propane and 2,2-bis(3-aminophenoxy)propane;

(xv) bis[(phenoxy)phenyl]propane diamines such as 2,2-bis[4-(4-aminophenoxy)phenyl]propane (BAPP) and 2,2-bis[4'(4''-aminophenoxy)phenyl]hexafluoropropane (BAFP); and (xvi) polyethylene glycol diamines.

The above-mentioned diamine compounds can be used singly or in the form of a mixture thereof.

The aforementioned unsaturated dicarboxylic acid and its derivative simultaneously have in the molecule; (i) an unsaturated group (cross-linking group) such as a carbon-carbon double bond (i.e., ethylene group) or a carbon-carbon triple bond (i.e., acetylene group), and (ii) a pair of carboxyl groups (i.e., dicarboxyl group) linking an adjacent carbon atom or an acid monoanhydride group thereof; and further they are: (iii) reactive organic compounds capable of forming an imide bond upon reaction with a compound having an amino group.

Preferred examples of the unsaturated dicarboxylic acid and its derivatives are as follows:

(a) maleic anhydride or its derivatives such as dimethylmaleic anhydride, diisopropylmaleic anhydride and dichloromaleic anhydride;

(b) tetrahydrophthalic anhydride and its derivatives such as methyltetrahydrophthalic anhydride; and (c) nadic anhydride (NA) or its derivatives such as methylnadic anhydride, oxynadic anhydride, methyloxynadic anhydride, dimethyloxynadic anhydride, ethylnadic anhydride and hexachloronadic anhydride.

The above-mentioned unsaturated dicarboxylic acid and its derivative can be used singly or in combination in the invention.

The aforementioned unsaturated monoamine compound is an reactive unsaturated monoamine compound which simultaneously has the above-mentioned unsaturated group and a monoamino group (primary amino group) and forms an imide bond upon reaction with a pair of adjacent carboxyl groups.

Examples of the unsaturated monoamine compounds are as follows:

(a) aliphatic monoamine compounds such as propargylamine (PA), 3-aminobutyne, 4-aminobutyne, 5-aminopentyne, 6-aminohexyne, 7-aminoheptyne, 4-amino-3-methylbutyne, 4-aminopentyne and allylamine (AA); and (b) aromatic monoamine compounds such as m-aminostyrene, p-aminostyrene, m-amino-α-methylstyrene, 1-isopropenyl-3-(2-aminoisopropyl)benzene, 1-isopropenyl-4-(2-aminoisopropyl)benzene, 3-aminophenylacetylene and 4-aminophenylacetylene.

The above-mentioned unsaturated monoamine compounds can be employed singly or in combination in the invention.

Examples of the organic polar solvents employed for the preparation of the imide oligomer of the invention include amide solvents such as N,N-dimethylformamide, N,N-dimethylacetamide, N-methyl-2-pyrrolidone (NMP) and N-methylcaprolactam; solvents containing sulfur atom such as dimethylsulfoxide, hexamethylphosphoramide, dimethylsulfone, tetramethylenesulfone and dimethyltetramethylenesulfone; phenol solvents such as cresol and phenol; and other solvents such as pyridine, ethylene glycol and tetramethyl urea.

As the organic polar solvent employable for the preparation of the solution composition according to the invention, there can be preferably mentioned the organic polar solvents used in the aforementioned reaction and other organic polar solvents having oxygen atom in the molecule such as dioxane, methyl ethyl ketone (MEK), monoglyme and diglyme.

If desired, the organic polar solvents exemplified above may be used in combination with aromatic hydrocarbon solvents such as benzene, toluene and xylene, or other organic solvents such as solvent naphtha, benzonitrile, acetone and methanol.

The terminal-modified imide oligomer of the present invention can be prepared, for example, by the following process. The aforementioned 2,3,3',4'-biphenyltetracarboxylic acid or its derivative (preferably, acid dianhydride thereof), diamine compound (preferably, aromatic diamine compound), unsaturated dicarboxylic acid or its derivative (preferably, acid dianhydride thereof) and/or unsaturated monoamine are used in such a manner that the whole amount of acid anhydride groups (or adjacent dicarboxylic acids) of all components essentially equals to the whole amount of amino groups of all components. Each component is caused to react with each other in the aforementioned organic polar solvent at a temperature of approx. not higher than 100° C., preferably not higher than 80° C., to produce "an oligomer having amide-acid bond". Then, the amide-acid oligomer (also referred to as "amic acid oligomer") is subjected to dehydration-ring closure reaction in the presence of an imidating agent at a low temperature of approx. 0° to 140° C. or by heating at a high temperature of 140° to 250° C., to produce an imide oligomer having an unsaturated group (specifically ethylene or acetylne) at the terminal which is capable of undergoing addition-polymerization reaction.

As the particularly preferred process for the preparation of the terminal-modified imide oligomer, there can be mentioned, for example, a process comprising homogeneously dissolving 2,3,3',4'-biphenyltetracarboxylic dianhydride, a diamine compound, an unsaturated acid monoanhydride and/or an unsaturated monoamine compound in the aforementioned organic polar amide solvent, causing them to react with each other at approx. 5° to 60° C. for 1 to 180 minutes under stirring to produce an amic acid oligomer, then raising the temperature of the resulting reaction liquid to 140° to 250° C., preferably 150° to 200° C., keeping the temperature of the liquid under stirring for 5 to 240 minutes to produce an imide oligomer through imidation reaction of the amic acid oligomer, and finally cooling the reaction liquid to around room temperature. It is preferred to carry out the above-mentioned reaction in an inert gas atmosphere such as an nitrogen gas atmosphere or an argon gas atmosphere.

The terminal-modified imide oligomer prepared as above can be used in the form of a powdery product. For obtaining the powdery imide oligomer, the above-obtained reaction liquid is poured into water, etc., and the terminal-modified imide oligomer is isolated from the resulting mixture in the form of a powdery product. Thus obtained powdery imide oligomer can be utilized, if necessary, after it is dissolved in an organic polar solvent. Otherwise, the terminal-modified imide oligomer can be used in the form of a solution composition containing said oligomer without isolating the oligomer from the reaction liquid. For example, the above-obtained reaction liquid per se may be used, or the reaction liquid may be appropriately concentrated or diluted.

Examples of the terminal-modified imide oligomers of the present invention include an imide oligomer having the formula (I) and an imide oligomer having the formula (II):

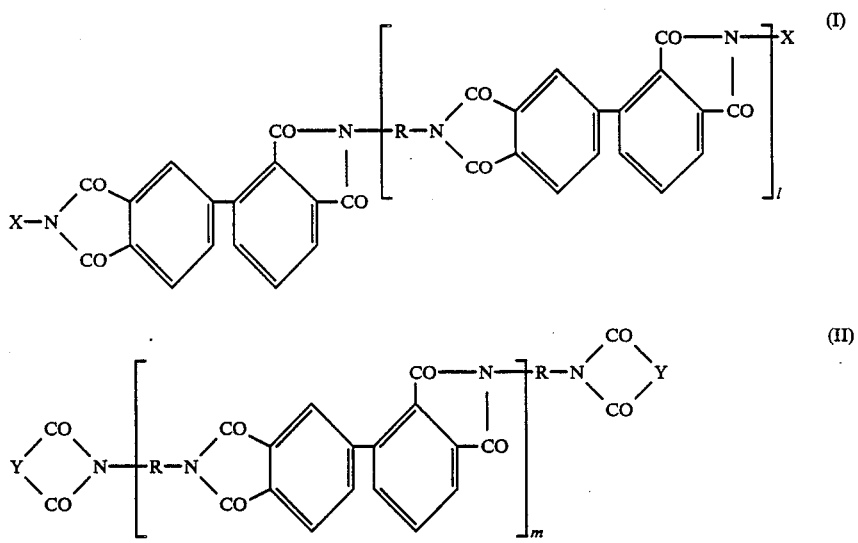

wherein X is a monovalent group which is formed by removing the amino group from a monoamine compound having an unsaturated group; Y is a group which is formed by removing the dicarboxyl group or acid monoanhydride group from of a dicarboxylic acid compound having unsaturated group or an acid monoanhydride thereof, respectively; each of l, and m is an integer of 1 to 80, particularly an integer of 1 to 50; and R is a divalent group which is formed by removing the amino group from a diamine compound.

The product obtained by the aforementioned process for the preparation of a terminal-modified imide oligomer contains the imide oligomer having the formula (I) and the formula (II) in various composition ratio depending upon the composition of the starting materials.

In the second place, the terminal-modified imide oligomer originating from the symmetric type compound is described.

The terminal-modified imide oligomer of the invention is an imide oligomer obtained by reacting 3,3',4,4'-biphenyltetracarboxylic acid or its derivative, a diamine compound, and an unsaturated dicarboxylic acids or its derivative and/or an unsaturated monoamine in an organic solvent in such a manner that the total number of acid anhydride groups or pairs of neighbouring acid groups (including its esters, etc.) of all components are essentially equal to the total number of amino groups of all components, and has an acetylene or ethylene unsaturated terminal group (i.e., end group) which is polymerizable in addition reaction and a number of imide bonds inside (in main chain) thereof. Further, the terminal-modified imide oligomer of the invention has a logarithmic viscosity of not more than 1.0, preferably in the range of approx. 0.01 to 0.8, more preferably in the range of approx. 0.03 to 0.7, that is, the imide oligomer has a relatively low molecular weight. The melting point of the terminal-modified imide oligomer is in the range of 50° to 300° C., preferably in the range of 60° to 260° C., and the imide oligomer is in the solid (particulate, powdery) state at room temperature (20° C.).

Examples of the aforementioned 3,3',4,4'-biphenyltetracarboxylic acid and its derivative include 3,3',4,4'-biphenyltetracarboxylic acid, 3,3',4,4'-biphenyltetracarboxylic dianhydride (s-BPDA), and their derivatives such as lower alcohol esters thereof and salts thereof.

Particularly preferred is 3,3',4,4'-biphenyltetracarboxylic dianhydride.

In the aromatic tetracarboxylic acid or its derivative, at least 50 molar %, preferably at least 70 molar %, more preferably at least 80 molar %, most preferably at least 90 molar %, of 3,3',4,4'-biphenyltetracarboxylic acid ot is derivative is contained. In other words, the above-mentioned 3,3',4,4'-biphenyltetracarboxylic acid or its derivative can be partially (not more than 50 molar %, preferably not more than 30 molar %, more preferably not more than 20 molar %, most preferably not more than 10 molar %) substituted by other aromatic tetracarboxylic acids or their derivatives such as 2,3,3',4'-biphenyltetracarboxylic dianhydride (s-BPDA), 3,3',4,4'-benzophenonetetracarboxylic dianhydride (BTDA), pyromellitic dianhydride (PMDA), 2,2-bis(3,4-dicarboxyphenyl)propane dianhydride, bis(3,4-dicarboxyphenyl)methane dianhydride, bis(3,4-dicarboxyphenyl)ether dianhydride, bis(3,4-dicarboxyphenyl)thioether dianhydride, bid(3,4-dicarboxyphenyl)phosphine dianhydride and bis(3,4-dicarboxyphenyl)sulfone dianhydride, or aliphatic tetracarboxylic acids such as butanetetracarboxylic dianhydride.

The diamine compound to be employed in combination with the 3,3',4,4'-biphenyltetracarboxylic acid or its derivative is selected from the following diamines: trialkylbenzene diamines, bis(phenoxy)benzene diamines, diphenylalkane diamines, bis(phenoxy)propane diamines, bis[(phenoxy)phenyl]propane diamines, diphenylsulfone diamines and bis(phenoxy)diphenylsulfone diamines. Examples of the trialkylbenzene diamines include the aforementioned toluene diamines (e.g., 3,5-diethyltoluene-2,4-diamine and 3,5-diethyltoluene-2,6-diamine) and 4,6-diethyl-2-methyl-1,3-diaminebenzene. Examples of the diphenylaklane diamines includes the aforementioned diphenylmethane diamines and bis(phenyl)propane diamines. Examples of other diamines are described hereinbefore.

The above-mentioned diamine compounds can be used singly or in the form of a mixture thereof.

The aforementioned description for the unsaturated dicarboxylic acid and its derivative and the unsaturated monoamine compound for the imide oligomer from the asymmetric type compound is appropriate in the case of the imide oligomer from the symmetric type compound.

The aforementioned organic polar solvents can be also employed for the preparation of the imide oligomer from the symmetric type compound and for the preparation of the solution composition.

The terminal-modified imide oligomer from the symmetric type compound can be prepared in the same manner as that described for the preparation of the imide oligomer from the asymmetric type compound.

As the particularly preferred process for the preparation of the terminal-modified imide oligomer, there can be mentioned, for example, a process comprising homogeneously dissolving 3,3',4,4'-biphenyltetracarboxylic dianhydride, the diamine compound, an unsaturated acid monoanhydride and/or an unsaturated monoamine compound in the aforementioned organic polar amide solvent, causing them to react with each other at approx. 5° to 60° C. for 1 to 120 minutes under stirring to produce an amic acid oligomer, then raising the temperature of the resulting reaction liquid to 140° to 250° C., preferably 150° to 200° C., keeping the temperature of the liquid under stirring for 5 to 180 minutes to produce an imide oligomer through imidation reaction of the amic acid oligomer, and finally cooling the reaction liquid to around room temperature. It is preferred to carry out the above-mentioned reaction in an inert gas atmosphere such as an nitrogen gas atmosphere or an argon gas atmosphere.

The terminal-modified imide oligomer prepared as above can be used in the form of a powdery product. For obtaining the powdery imide oligomer, the above-obtained reaction liquid is poured into water, etc., and the terminal-modified imide oligomer is isolated from the resulting mixture in the form of a powdery product. Thus obtained powdery imide oligomer can be utilized, if necessary, after it is dissolved in an organic polar solvent. Otherwise, the terminal-modified imide oligomer can be used in the form of a solution composition containing said oligomer without isolating the oligomer from the reaction liquid. For example, the above-obtained reaction liquid per se may be used, or the reaction liquid may be appropriately concentrated or diluted.

Examples of the terminal-modified imide oligomers of symmetric typ include an imide oligomer having the formula (III) and an imide oligomer having the formula (IV):

divalent group which is formed by removing the amino group from a diamine compound.

The product obtained by the aforementioned process for the preparation of a terminal-modified imide oligomer contains the imide oligomer having the formula (III) and the formula (IV) in various composition ratio depending upon the composition of the starting materials.

The solution composition of the invention contains the above-mentioned terminal-modified imide oligomer from the asymmetric type or symmetric type compound in an amount of 3 to 80% by weight which is homogeneously dissolved in an organic polar solvent.

The terminal-modified imide oligomer used in the preparation of the solution composition of the invention can be sufficiently dissolved in various solvents used in the preparation of the aforementioned terminal-modified imide oligomer such as organic polar amide solvents (e.g., N,N-dimethylformamide, N,N-dimethylacetamide, N-methyl-2-pyrrolidone and N-methylcaprolactam), organic polar solvents having sulfur atom (e.g., dimethylsulfoxide and dimethylsulfone), and phenol solvents (e.g., phenol, cresol and halogenated phenol), so that the solution composition having a concentration of 3 to 80% by weight, preferably 5 to 60% by weight, can be easily prepared.

The aforementioned terminal-modified imide oligomer obtained using a diamine compound such as 4,4'-methylene-bis(2,6-diethylaniline) (M-DEA) or 4,4'-methylene-bis(2-ethyl-6-methylaniline) (M-MEA) can be dissolved in solvents such as methanol, methyl ethyl ketone, methyl isobutyl ketone, dioxane, monoglyme, diglyme and pyridine in an amount of not less than 3% by weight, particularly 5 to 60% by weight. Accordingly, a solution composition of the imide oligomer and the aforementioned solvent can be readily prepared, and thus prepared solution composition can be suitably used depending upon the purpose.

The solution composition of the present invention preferably has a solution viscosity at 25° C. (20 wt. %) of 0.1 to 100 poise, more preferably 0.4 to 80 poise for the oligomer from the asymmetric type compound and 0.4 to 70 poise for the oligomer from the symmetric type compound.

The solution composition of the invention can be used as a starting material for the preparation of molded

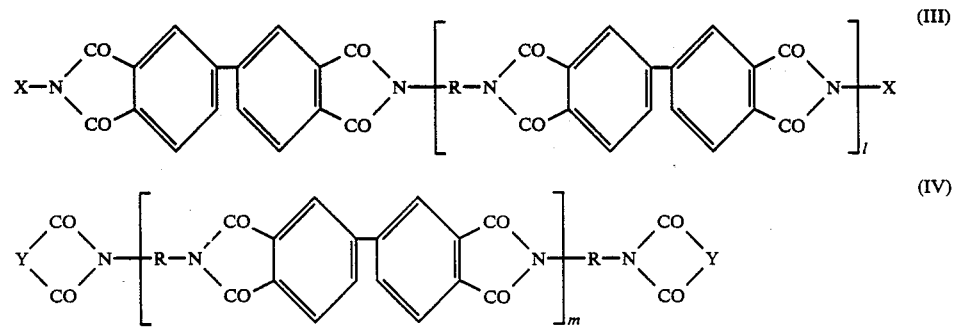

wherein X is a monovalent group which is formed by removing the amino group from a monoamine compound having an unsaturated group; Y is a group which is formed by removing the dicarboxyl group or acid monoanhydride group from of a dicarboxylic acid compound having unsaturated group or an acid monoanhydride thereof, respectively; each of $l$, and $m$ is an integer of 1 to 80, particularly an integer of 1 to 50; and R is a products or laminated products, an adhesive, or a starting material for the preparation of a composite material wherein the solution composition is impregnated into an appropriate reinforced fibrous material.

The terminal-modified imide oligomer solution composition of the invention is subjected to appropriate various processes comprising, for example, impregnation into a substrate or coating to a substrate and heating at high temperatures such as a temperature of 200° to 400° C., preferably 220° to 300° C. for the oligomer from the asymmetric type compound and 220° to 380° C. for the oligomer from the symmetric type compound, for approx. 1 to 30 hours, preferably 1.5 to 25 hours, after removing the solvent from the solution composition or with removing it therefrom, to obtain a heat-cured product.

The heat-cured product obtained from the solution composition of the invention has a thermal decomposition initiation temperature of not lower than 360° C. and a second-order transition temperature (Tg) of not lower than 250° C., and hence the product shows excellent heat resistance.

The terminal-modified imide oligomer of the present invention can be heat-cured in the presence of various catalysts such as a radical polymerization catalyst, a cationic polymerization catalyst and an organic metal catalysts.

EXAMPLES

The present invention will be further illustrated by the following examples.

In those examples, a logarithmic viscosity ($\eta inh$) was determined as follows. A sample polymer was homogeneously dissolved in N-methyl-2-pyrrolidone to prepare a polymer solution having a polymer concentration of 0.5 g/100 ml-solvent. The solution viscosity of the polymer solution and the viscosity of the solvent only were measured at 30° C., and the obtained values were introduced into the following equation to calculate the logarithmic viscosity.

$$\eta inh = \frac{\ln (\text{solution viscosity/solvent viscosity})}{\text{polymer concentration}}$$

In Tables 1 to 4, the evaluation of the solubility is classified into the following three classes:

AA: The obtained oligomer is soluble in the solvent in a concentration of not less than 10 wt. %.

BB: The obtained oligomer is soluble in the solvent in a concentration of 1 to 10 wt. %.

CC: The obtained oligomer is insoluble or soluble in the solvent in a concentration of up to 1 wt. %.

EXAMPLE 1

Into a flask of 500 ml were charged (a) 14.62 g. (0.05 mole) of 2,3,3',4'-biphenyltetracarboxylic dianhydride (a-BPDA), (b) 29.06 g. (0.1 mole) of 1,3-bis(4-aminophenoxy)benzene (TPE-R), (c) 16.32 g. (0.1 mole) of nadic anhydride (NA), and (d) 240 g. of N-methyl-2-pyrrolidone (NMP), and they were stirred at 50° C. for one hour in a nitrogen gas stream to produce an amic acid oligomer. Then, the resulting reaction liquid was heated to 185° C. and stirred for one hour at the same temperature to produce an imide oligomer.

The reaction liquid was cooled to room temperature (approx. 25° C.), and then introduced into water to deposit a powdery imide oligomer. The powdery imide oligomer was collected by filtration, and washed with methanol of 25° C. twice. Thereafter, the imide oligomer was dried under reduced pressure to obtain a terminal-modified imide oligomer.

The physical properties (logarithmic viscosity, solubility, melting point, etc.) of the terminal-modified imide oligomer are set forth in Table 1.

The above-obtained powdery terminal-modified imide oligomer was charged into a mold of box type (length: 100 mm, width: 20 mm), and the imide oligomer in the mold was heated to 250° C. to melt the imide oligomer. To thus molten imide oligomer was applied pressure of 10 kg/cm², and the oligomer was heated to 330° C. under that pressure. The temperature of the imide oligomer was kept for 15 minutes and then cooled. The resulting molded product (length: 100 mm, width: 20 mm, thickness: 0.3 mm) was then taken out of the mold.

The thermal decomposition initiation temperature, second-order transition temperature, etc. of the obtained product are also set forth in Table 1.

EXAMPLES 2-17

The procedures for preparing a terminal-modified imide oligomer in Example 1 were repeated except for using various diamine compounds set forth in Table 1 and varying the amounts of (a) acid dianhydride, (b) diamine compound and (c) unsaturated acid monoanhydride to those set forth in Table 1, to prepare a variety of terminal-modified imide oligomers.

The physical properties of the obtained imide oligomers are set forth in Table 1.

Using each of the obtained oligomers, the procedures for preparing a molded product in Example 1 were repeated except for melting the imide oligomer at a temperature higher than the melting point of the imide oligomer by 50° C. and performing the final heating at a temperature higher than that used at the same stage of Example 1 by 50° C., to prepare a variety of molded products.

The thermal decomposition initiation temperature, second-order transition temperature, etc. of each of the obtained products are also set forth in Table 1.

COMPARISON EXAMPLES 1-3

The procedures for preparing a terminal-modified imide oligomer in Example 1 were repeated except for using the acid dianhydrides set forth in Table 1, to prepare a variety of terminal-modified imide oligomers.

The physical properties of the obtained imide oligomers are set forth in Table 1.

Using each of the obtained oligomers, the procedures for preparing a molded product in Example 1 were repeated except for melting the imide oligomer at a temperature higher than the melting point of the imide oligomer by 50° C. and performing the final heating at a temperature higher than that used at the same stage of Example 1 by 50° C., to prepare a variety of molded products.

The thermal decomposition initiation temperature, second-order transition temperature, etc. of each of the obtained products are also set forth in Table 1.

EXAMPLE 18

Into a flask of 500 ml were charged (a) 35.63 g. (0.12 mole) of 2,3,3',4'-biphenyltetracarboxylic dianhydride (a-BPDA), (b) 17.70 g. (0.06 mole) of 1,3-bis(4-aminophenoxy)benzene (TPE-R), (c) 6.67 g. (0.12 mole) of propargyl amine (PA), and (d) 240 g. of N-methyl-2-pyrrolidone (NMP), and they were stirred at 50° C. for one hour in a nitrogen gas stream to produce an amic acid oligomer. Then, the obtained reaction liquid was heated to 185° C., and stirred for one hour at the same temperature to produce an imide oligomer.

The reaction liquid was cooled to room temperature (approx. 25° C.), and then introduced into water to deposit a powdery imide oligomer. The powdery imide oligomer was collected by filtration and washed twice with methanol at 25° C. Then, the imide oligomer was dried under reduced pressure to obtain a terminal-modified imide oligomer.

The physical properties (logarithmic viscosity, solubility, melting point, etc.) of the terminal-modified imide oligomer are set forth in Table 1.

The above-obtained powdery terminal-modified imide oligomer was charged into a mold of box type (length: 100 mm, width: 20 mm), and the imide oligomer in the mold was heated to 250° C. to melt the imide oligomer. To thus molten imide oligomer was applied pressure of 10 kg/cm$^2$ and, and the oligomer was heated at 330° C. under that pressure. The temperature of the imide oligomer was kept for 15 minutes and cooled. The resulting molded product (length: 100 mm, width: 20 mm, thickness: 0.3 mm) was then taken out of the mold.

The thermal decomposition initiation temperature, second-order transition temperature, etc. of the obtained product are also set forth in Table 2.

EXAMPLES 19–38

The procedures for preparing a terminal-modified imide oligomer in Example 18 were repeated except for using acid dianhyrdies, diamine compounds and unsaturated monoamines, all stated in Table 2 and varying the amounts of (a) acid dianhydride, (b) diamine compound and (c) unsaturated monoamine to those set forth in Table 2, to prepare a variety of terminal-modified imide oligomers.

The physical properties of the obtained oligomers are set forth in Table 2.

Using each of the obtained oligomers, the procedures for preparing a molded product in Example 18 were repeated except for melting the imide oligomer at a temperature higher than the melting point of the imide oligomer by 50° C. and performing the final heating at a temperature higher than that used in the same stage of Example 18 by 50° C., to prepare a variety of molded products.

The thermal decomposition starting temperature, second-order transition temperature, etc. of each of the obtained products are also set forth in Table 2.

COMPARISON EXAMPLES 4–6

The procedures for preparing a terminal-modified imide oligomer in Example 18 were repeated except for using acid dianhydrides set forth in Table 2, to prepare a variety of terminal-modified imide oligomers.

The physical properties of the obtained imide oligomers are set forth in Table 2.

TABLE 1

| | Acid Dianhydride | | Diamine Compound | | Unsaturated Monoanhydride | | Logarithmic Viscosity (30° C.) $\eta$ inh |
|---|---|---|---|---|---|---|---|
| | Kind | Amount (mole) | Kind | Amount (mole) | Kind | Amount (mole) | |
| Example | | | | | | | |
| 1 | a-BPDA | 0.05 | TPE-R | 0.1 | NA | 0.1 | 0.07 |
| 2 | a-BPDA | 0.2 | TPE-R | 0.3 | NA | 0.2 | 0.08 |
| 3 | a-BPDA | 0.05 | TPE-R | 0.06 | NA | 0.02 | 0.15 |
| 4 | a-BPDA | 0.05 | DADE | 0.1 | NA | 0.1 | 0.06 |
| 5 | a-BPDA | 0.05 | TPE-Q | 0.1 | NA | 0.1 | 0.07 |
| 6 | a-BPDA | 0.05 | BAPP | 0.1 | NA | 0.1 | 0.07 |
| 7 | a-BPDA | 0.05 | 4-BAPS | 0.1 | NA | 0.1 | 0.07 |
| 8 | a-BPDA | 0.05 | 4-BAPS | 0.06 | NA | 0.02 | 0.16 |
| 9 | a-BPDA | 0.05 | 3-BAPS | 0.1 | NA | 0.1 | 0.07 |
| 10 | a-BPDA | 0.05 | 3,3'-DDS | 0.1 | NA | 0.1 | 0.06 |
| 11 | a-BPDA | 0.05 | DADM | 0.1 | NA | 0.1 | 0.06 |
| 12 | a-BPDA | 0.05 | M-DEA | 0.1 | NA | 0.1 | 0.06 |
| 13 | a-BPDA | 0.05 | M-MEA | 0.1 | NA | 0.1 | 0.06 |
| 14 | a-BPDA | 0.05 | MPD | 0.1 | NA | 0.1 | 0.06 |
| 15 | a-BPDA | 0.05 | BAFPR | 0.1 | NA | 0.1 | 0.07 |
| 16 | a-BPDA | 0.05 | BHFP | 0.1 | NA | 0.1 | 0.06 |
| 17 | a-BPDA | 0.05 | DETDA | 0.1 | NA | 0.1 | 0.06 |
| Com. Ex. | | | | | | | |
| 1 | s-BPDA | 0.05 | DADE | 0.1 | NA | 0.1 | — |
| 2 | BTDA | 0.05 | TPE-R | 0.1 | NA | 0.1 | — |
| 3 | PMDA | 0.05 | TPE-R | 0.1 | NA | 0.1 | — |

| | Solubility | | | | Melting Point (°C.) | Tg (°C.) | Properties of Molded Product Thermal Decompn. Initiation (°C.) |
|---|---|---|---|---|---|---|---|
| | NMP | Dioxane | MEK | Acetone | | | |
| Example | | | | | | | |
| 1 | AA | AA | BB | BB | 192 | 290 | 410 |
| 2 | AA | AA | BB | BB | 190 | 273 | 420 |
| 3 | AA | AA | BB | BB | 225 | 265 | — |
| 4 | AA | BB | CC | CC | 265 | 354 | 402 |
| 5 | AA | CC | CC | CC | 263 | — | — |
| 6 | AA | AA | BB | BB | 195 | 272 | 405 |
| 7 | AA | AA | BB | BB | 210 | 320 | 390 |
| 8 | AA | — | — | — | 255 | 330 | 442 |
| 9 | AA | AA | BB | BB | 200 | 272 | — |
| 10 | AA | AA | CC | CC | 230 | — | — |
| 11 | AA | AA | BB | BB | 208 | — | — |
| 12 | AA | AA | AA | AA | 190 | — | — |
| 13 | AA | AA | AA | AA | 215 | — | — |

TABLE 1-continued

| | | | | | | | |
|---|---|---|---|---|---|---|---|
| 14 | AA | AA | CC | CC | 220 | — | — |
| 15 | AA | — | — | — | 195 | — | — |
| 16 | AA | — | — | — | 259 | — | — |
| 17 | AA | — | — | — | 192 | — | — |
| Com. Ex. | | | | | | | |
| 1 | CC | CC | CC | CC | 210< | 295 | 390 |
| 2 | CC | CC | CC | CC | 320< | — | — |
| 3 | CC | CC | CC | CC | 320< | — | — |

TABLE 2

| | Acid Dianhydride | | Diamine Compound | | Unsaturated Monoamine | | Logarithmic Viscosity (30° C.) |
|---|---|---|---|---|---|---|---|
| | Kind | Amount (mole) | Kind | Amount (mole) | Kind | Amount (mole) | |
| Example | | | | | | | |
| 18 | a-BPDA | 0.12 | TPE-R | 0.06 | PA | 0.12 | 0.07 |
| 19 | a-BPDA | 0.3 | TPE-R | 0.2 | PA | 0.2 | 0.08 |
| 20 | a-BPDA | 0.6 | TPE-R | 0.5 | PA | 0.2 | 0.13 |
| 21 | a-BPDA | 0.11 | TPE-R | 0.10 | PA | 0.02 | 0.18 |
| 22 | a-BPDA | 0.12 | DADE | 0.06 | PA | 0.12 | 0.06 |
| 23 | a-BPDA | 0.12 | TPE-Q | 0.06 | PA | 0.12 | 0.07 |
| 24 | a-BPDA | 0.12 | BAPP | 0.06 | PA | 0.12 | 0.07 |
| 25 | a-BPDA | 0.6 | BAPP | 0.5 | PA | 0.2 | 0.09 |
| 26 | a-BPDA | 0.12 | 4-BAPS | 0.06 | PA | 0.12 | 0.07 |
| 27 | a-BPDA | 0.12 | 3-BAPS | 0.06 | PA | 0.12 | 0.07 |
| 28 | a-BPDA | 0.6 | 3-BAPS | 0.5 | PA | 0.2 | 0.09 |
| 29 | a-BPDA | 0.12 | 3,3'-DDS | 0.06 | PA | 0.12 | 0.06 |
| 30 | a-BPDA | 0.12 | DADM | 0.06 | PA | 0.12 | 0.06 |
| 31 | a-BPDA | 0.12 | M-DEA | 0.06 | PA | 0.12 | 0.06 |
| 32 | a-BPDA | 0.12 | M-MEA | 0.06 | PA | 0.12 | 0.06 |
| 33 | a-BPDA | 0.12 | BAFPR | 0.06 | PA | 0.12 | 0.07 |
| 34 | a-BPDA | 0.12 | BHFP | 0.06 | PA | 0.12 | 0.06 |
| 35 | a-BPDA | 0.12 | DETDA | 0.06 | PA | 0.12 | 0.06 |
| 36 | a-BPDA | 0.12 | DADE | 0.06 | AA | 0.12 | 0.06 |
| 37 | a-BPDA | 0.12 | 3-BAPS | 0.06 | AA | 0.12 | 0.07 |
| 38 | a-BPDA s-BPDA | 0.08 0.02 | 3-BAPS | 0.05 | PA | 0.10 | 0.07 |
| 39 | a-BPDA | 0.12 | o-TN | 0.06 | PA | 0.12 | 0.07 |
| Com. Ex. | | | | | | | |
| 4 | s-BPDA | 0.12 | DADE | 0.06 | PA | 0.12 | — |
| 5 | BTDA | 0.12 | TPE-R | 0.06 | PA | 0.12 | — |
| 6 | PMDA | 0.12 | TPE-R | 0.06 | PA | 0.12 | — |

| | Solubility | | | | Melting Point (°C.) | Properties of Molded Product | |
|---|---|---|---|---|---|---|---|
| | NMP | Dioxane | MEK | Acetone | | Tg (°C.) | Thermal Decompn. Initiation (°C.) |
| Example | | | | | | | |
| 18 | AA | AA | BB | BB | 190 | 288 | 395 |
| 19 | AA | AA | — | — | 190 | 275 | — |
| 20 | AA | AA | CC | CC | 225 | 257 | 452 |
| 21 | AA | — | — | — | 245 | 259 | — |
| 22 | AA | CC | CC | CC | 203 | 342 | — |
| 23 | AA | AA | CC | CC | 190 | 290 | — |
| 24 | AA | AA | BB | BB | 180 | 271 | 420 |
| 25 | AA | — | — | — | — | 260 | 462 |
| 26 | AA | AA | CC | CC | 195 | 288 | — |
| 27 | AA | AA | BB | BB | 183 | 264 | 417 |
| 28 | AA | — | — | — | 222 | 254 | 432 |
| 29 | AA | AA | CC | CC | 195 | — | 425 |
| 30 | AA | AA | CC | CC | 202 | 322 | — |
| 31 | AA | AA | — | AA | 175 | 307 | — |
| 32 | AA | AA | — | — | 175 | 322 | — |
| 33 | AA | AA | AA | AA | 182 | — | — |
| 34 | AA | AA | AA | AA | 206 | — | — |
| 35 | AA | AA | AA | AA | 140 | — | — |
| 36 | AA | — | — | — | 185 | — | — |
| 37 | AA | — | — | — | 180 | — | — |
| 38 | AA | AA | — | — | 185 | 281 | 415 |
| 39 | AA | AA | — | — | 205 | 320 | 390 |
| Com. Ex. | | | | | | | |
| 4 | CC | CC | CC | CC | 275< | — | — |
| 5 | CC | CC | CC | CC | 320< | — | — |
| 6 | CC | CC | CC | CC | 320< | — | — |

EXAMPLE 39

The procedures for preparing a terminal-modified imide oligomer in Example 18 were repeated except for using 3,3'-dimethylbenzidine (o-TN) to prepare a terminal-modified imide oligomer.

The obtained imide oligomer had a logarithmic viscosity of 0.07 (at 25° C.), and was soluble in dioxane in a concentration of not less than 10 wt. % (Class AA). The melting point of the imide oligomer was 205° C.

Further, when a molded product was prepared using the obtained imide oligomer in the same manner as stated in Example 1, Tg and thermal decomposition temperature of the product were 320° C. and 390° C., respectively.

EXAMPLE 40

29.34 g. (0.1 mole) of 1,3-bis(4-aminophenoxy)benzene (TPE-R) and 230 g. N-methyl-2-pyrrolidone (NMP) were mixed in a separable flask under heating by means of an oil bath, and the mixture was stirred at 50° C. to prepare a solution. To the solution was added 14.71 g. (0.05 mole) of 2,3,3',4'-biphenyltetracarboxylic dianhydride (a-BPDA), and they were stirred for one hour to prepare a homogeneous solution.

Subsequently, the temperature of oil in the oil bath was raised to 220° C., and the above obtained solution was stirred for 2 hours in the oil bath to perform imidation reaction of amide-acid bonds. The resulting solution was cooled to 60° C., and then to the cooled solution was added 12.75 g. (0.13 mole) of maleic anhydride. The obtained mixture was stirred for one hour to produce an oligomer in the reaction liquid. Then, to the reaction liquid were added 51.05 g. (0.5 mole) of acetic anhydride and 5.06 g. (0.05 mole) of triethylamine, and they were stirred for 2 hours at 60° C., to perform imidation reaction of amide-acid bonds so as to produce an imide oligomer.

The obtained imide oligomer solution was dropped in 1 l of water to deposit maleic acid terminal-modified imide oligomer. The solution of the imide oligomer was subjected to filtration and washed several times to sufficiently remove NMP, and then subjected to drying to prepare a powdery maleic acid terminal-modified imide oligomer.

The above-obtained terminal-modified imide oligomer had a melting point of 196° C. and a logarithmic viscosity of 0.07. Further, the imide oligomer was well dissolved in NMP and dioxane.

The powdery terminal-modified imide oligomer was charged in a mold. The temperature of the imide oligomer in the mold was then raised to not lower than 180° C. (curing starting temperature), and to the imide oligomer was applied a pressure of 5 kg/cm$^2$ at 200° C. Thereafter, the temperature of the imide oligomer was raised to 240° C., and the imide oligomer was allowed to stand for 30 min. at that temperature. Thus, a molded product of strip form was obtained. The obtained product had Tg and thermal decomposition initiation point of 290° C. and 380° C., respectively.

EXAMPLE 41

Into a flask of 500 ml were charged (a) 14.62 g. (0.05 mole) of 3,3',4,4'-biphenyltetracarboxylic dianhydride (s-BPDA), (b) 29.06 g. (0.1 mole) of 1,3-bis(4-aminophenoxy)benzene (TPE-R), (c) 16.32 g. (0.1 mole) of nadic anhydride (NA), and (d) 240 g. of N-methyl-2-pyrrolidone (NMP), and they were stirred at 50° C. for one hour in a nitrogen gas stream to produce an amic acid oligomer. Then, the resulting reaction liquid was heated to 185° C. and stirred for one hour at the same temperature to produce an imide oligomer.

The reaction liquid was cooled to room temperature (approx. 25° C.), and then introduced into water to deposit a powdery imide oligomer. The powdery imide oligomer was collected by filtration, and washed with methanol of 25° C. twice. Thereafter, the imide oligomer was dried under reduced pressure to obtain a terminal-modified imide oligomer.

The physical properties (logarithmic viscosity, solubility, melting point, etc.) of the terminal-modified imide oligomer are set forth in Table 3.

The above-obtained powdery terminal-modified imide oligomer was charged into a mold of box type (length: 100 mm, width: 20 mm), and the imide oligomer in the mold was heated to 250° C. to melt the imide oligomer. To thus molten imide oligomer was applied pressure of 10 kg/cm$^2$, and the oligomer was heated to 330° C. under that pressure. The temperature of the imide oligomer was kept for 15 minutes and then cooled. The resulting molded product (length: 100 mm, width: 20 mm, thickness: 0.3 mm) was then taken out of the mold.

The thermal decomposition initiation temperature, second-order transition temperature, etc. of the obtained product are also set forth in Table 3.

EXAMPLES 42–52

The procedures for preparing a terminal-modified imide oligomer in Example 41 were repeated except for using various diamine compounds set forth in Table 3 and varying the amounts of (a) acid dianhydride, (b) diamine compound and (c) unsaturated acid monoanhydride to those set forth in Table 3, to prepare a variety of terminal-modified imide oligomers.

The physical properties of the obtained imide oligomers are set forth in Table 3.

Using each of the obtained oligomers, the procedures for the preparation of a molded product in Example 41 were repeated except for melting the imide oligomer at a temperature higher than the melting point of the imide oligomer by 50° C. and performing the final heating at a temperature higher than that used at the same stage of Example 41 by 50° C., to prepare a variety of molded products.

The thermal decomposition initiation temperature, second-order transition temperature, etc. of each of the obtained products are also set forth in Table 3.

COMPARISON EXAMPLES 7–8

The procedures for preparing a terminal-modified imide oligomer in Example 41 were repeated except for using the acid dianhydrides set forth in Table 3, to prepare a variety of terminal-modified imide oligomers.

The physical properties of the obtained imide oligomers are set forth in Table 3.

The thermal decomposition initiation temperature, second-order transition temperature, etc. of each of the obtained products are also set forth in Table 3.

EXAMPLE 53

Into a flask of 500 ml were charged (a) 35.63 g. (0.12 mole) of 3,3',4,4'-biphenyltetracarboxylic dianhydride (s-BPDA), (b) 24.63 g. (0.06 mole) of 2,4-bis[4-(4-aminophenoxy)phenyl]propane (BAPP), (c) 6.67 g. (0.12 mole) of propargyl amine (PA), and (d) 240 g. of N- methyl-2-pyrrolidone (NMP), and they were stirred at 50° C. for one hour in a nitrogen gas stream to produce an amic acid oligomer. Then, the obtained reaction liquid was heated to 185° C., and stirred for one hour at the same temperature to produce an imide oligomer.

The reaction liquid was cooled to room temperature (approx. 25° C.), and then introduced into water to deposit a powdery imide oligomer. The powdery imide oligomer was collected by filtration and washed twice with methanol at 25° C. Then, the imide oligomer was dried under reduced pressure to obtain a terminal-modified imide oligomer.

The physical properties (logarithmic viscosity, solubility, melting point, etc.) of the terminal-modified imide oligomer are set forth in Table 4.

The above-obtained powdery terminal-modified imide oligomer was charged into a mold of box type (length: 100 mm, width: 20 mm), and the imide oligomer in the mold was heated to 250° C. to melt the imide oligomer. To thus molten imide oligomer was applied pressure of 10 kg/cm$^2$ and, and the oligomer was heated at 330° C. under that pressure. The temperature of the imide oligomer was kept for 15 minutes and cooled. The resulting molded product (length: 100 mm, width: 20 mm, thickness: 0.3 mm) was then taken out of the mold.

The thermal decomposition initiation temperature, second-order transition temperature, etc. of the obtained product are also set forth in Table 4.

EXAMPLES 54-57

The procedures for preparing a terminal-modified imide oligomer in Example 53 were repeated except for using acid dianhyrdies, diamine compounds and unsaturated monoamines, all stated in Table 4 and varying the amounts of (a) acid dianhydride, (b) diamine compound and (c) unsaturated monoamine to those set forth in Table 4, to prepare a variety of terminal-modified imide oligomers.

The physical properties of the obtained oligomers are set forth in Table 4.

Using each of the obtained oligomers, the procedures for preparing a molded product in Example 53 were repeated except for melting the imide oligomer at a temperature higher than the melting point of the imide oligomer by 50° C. and performing the final heating at a temperature higher than that used in the same stage of Example 53 by 50° C., to prepare a variety of molded products.

The thermal decomposition starting temperature, second-order transition temperature, etc. of each of the obtained products are also set forth in Table 4.

COMPARISON EXAMPLES 9-10

The procedures for preparing a terminal-modified imide oligomer in Example 53 were repeated except for using acid dianhydrides set forth in Table 4, to prepare a variety of terminal-modified imide oligomers.

The physical properties of the obtained imide oligomers are set forth in Table 4.

TABLE 3

| | Acid Dianhydride | | Diamine Compound | | Unsaturated Monoanhydride | | Logarithmic Viscosity (30° C.) $\eta$ inh |
|---|---|---|---|---|---|---|---|
| | Kind | Amount (mole) | Kind | Amount (mole) | Kind | Amount (mole) | |
| Example | | | | | | | |
| 41 | s-BPDA | 0.05 | TPE-R | 0.1 | NA | 0.1 | 0.07 |
| 42 | s-BPDA | 0.05 | BAPP | 0.1 | NA | 0.1 | 0.07 |
| 43 | s-BPDA | 0.05 | 4-BAPS | 0.1 | NA | 0.1 | 0.07 |
| 44 | s-BPDA | 0.05 | 4-BAPS | 0.06 | NA | 0.02 | 0.16 |
| 45 | s-BPDA | 0.05 | 3-BAPS | 0.1 | NA | 0.1 | 0.07 |
| 46 | s-BPDA | 0.05 | 3-BAPS | 0.06 | NA | 0.02 | 0.16 |
| 47 | s-BPDA | 0.05 | 3,3'-DDS | 0.1 | NA | 0.1 | 0.06 |
| 48 | s-BPDA | 0.2 | 3,3'-DDS | 0.3 | NA | 0.2 | 0.08 |
| 49 | s-BPDA | 0.05 | 3,3'-DDS | 0.06 | NA | 0.02 | 0.15 |
| 50 | s-BPDA | 0.05 | M-DEA | 0.1 | NA | 0.1 | 0.06 |
| 51 | s-BPDA | 0.05 | M-MEA | 0.1 | NA | 0.1 | 0.06 |
| 52 | s-BPDA | 0.05 | DETDA | 0.1 | NA | 0.1 | 0.06 |
| Com. Ex. | | | | | | | |
| 7 | BTDA | 0.05 | TPE-R | 0.1 | NA | 0.1 | — |
| 8 | PMDA | 0.05 | TPE-R | 0.1 | NA | 0.1 | — |

| | Solubility | | | | Melting Point (°C.) | Properties of Molded Product | |
|---|---|---|---|---|---|---|---|
| | | | | | | Tg (°C.) | Thermal Decompn. Initiation (°C.) |
| | NMP | Dioxane | MEK | Acetone | | | |
| Example | | | | | | | |
| 41 | AA | AA | CC | CC | 179 | — | — |
| 42 | AA | AA | BB | BB | 190 | — | — |
| 43 | AA | AA | BB | BB | 207 | 314 | 403 |
| 44 | AA | — | — | — | 258 | 280 | 435 |
| 45 | AA | AA | BB | BB | 180 | — | 399 |
| 46 | AA | — | — | — | 223 | — | — |
| 47 | AA | BB | CC | CC | 202 | 292 | 395 |
| 48 | AA | — | — | — | 205 | 296 | 414 |
| 49 | AA | — | — | — | 150 | — | — |
| 50 | AA | AA | AA | AA | 190 | — | — |
| 51 | AA | AA | AA | AA | 230 | — | — |
| 52 | AA | AA | — | — | 230 | — | — |
| Com. Ex. | | | | | | | |

TABLE 3-continued

| 7 | CC | CC | CC | CC | 320< | — | — |
| 8 | CC | CC | CC | CC | 320< | — | — |

TABLE 4

| | Acid Dianhydride | | Diamine Compound | | Unsaturated Monoamine | | Logarithmic Viscosity (30° C.) |
|---|---|---|---|---|---|---|---|
| | Kind | Amount (mole) | Kind | Amount (mole) | Kind | Amount (mole) | |
| Example | | | | | | | |
| 53 | s-BPDA | 0.12 | BAPP | 0.06 | PA | 0.12 | 0.07 |
| 54 | s-BPDA | 0.12 | 3-BAPS | 0.06 | PA | 0.12 | 0.07 |
| 55 | s-BPDA | 0.12 | 3,3'-DDS | 0.06 | PA | 0.12 | 0.06 |
| 56 | s-BPDA | 0.12 | M-MEA | 0.06 | PA | 0.12 | 0.06 |
| 57 | s-BPDA | 0.12 | DETDA | 0.06 | PA | 0.12 | 0.06 |
| Com. Ex. | | | | | | | |
| 9 | BTDA | 0.12 | TPE-R | 0.06 | PA | 0.12 | — |
| 10 | PMDA | 0.12 | TPE-R | 0.06 | PA | 0.12 | — |

| | Solubility | | | | Melting Point (°C.) | Tg (°C.) | Properties of Molded Product Thermal Decompn. Initiation (°C.) |
|---|---|---|---|---|---|---|---|
| | NMP | Dioxane | MEK | Acetone | | | |
| Example | | | | | | | |
| 53 | AA | CC | — | — | 245 | — | — |
| 54 | AA | AA | — | — | 198 | 284 | 421 |
| 55 | AA | AA | — | — | 210 | — | — |
| 56 | AA | AA | — | — | 200 | — | — |
| 57 | AA | AA | BB | — | 125 | — | — |
| Com. Ex. | | | | | | | |
| 9 | CC | CC | CC | CC | 320< | — | — |
| 10 | CC | CC | CC | CC | 320< | — | — |

We claim:

1. A terminal-modified imide oligomer wherein:
said oligomer is produced by reacting an aromatic tetracarboxylic acid, its dianhydride, its ester or its salt containing at least 50 molar % of 2,3,3',4'-biphenyltetracarboxylic acid, its dianhydride, its ester or its salts, a diamine compound, and an unsaturated dicarboxylic acid having an ethylenic or acetylenic unsaturated group or its anhydride in an organic solvent;
said oligomer has an ethylenic or acetylenic unsaturated group as a terminal group and an internal imide bond inside of the oligomer;
said oligomer is soluble in N-methyl-2-pyrrolidone in an amount of not less than 3% by weight at 30° C.; and
said oligomer has a logarithmic viscosity of not more than 1.0, said logarithmic viscosity being measured under the conditions of a concentration of 0.5 g/100 ml N-methyl-2-pyrrolidone and a temperature of 30° C., and has a melting point in the range of 50° to 300° C.

2. The terminal-modified imide oligomer as claimed in claim 1, wherein said dianhydride of the aromatic tetracarboxylic acid consists essentially of 2,3,3',4'-biphenyltetracarboxylic acid dianhydride.

3. The terminal-modified imide oligomer as claimed in claim 1, wherein said diamine compound is selected from the group consisting of benzene diamines, toluene diamines, xylylene diamines, diphenyl ether diamines, diphenyl thioether diamines, benzophenone diamines, diphenylphosphine diamines, diphenylsulfide diamines, diphenylsulfone diamines, diphenylmethane diamines, bis(phenyl)propane diamines, bis(phenoxy)diphenylsulfone diamines, benzidines, bis(phenoxy)benzene diamines, bis(phenoxy)propane diamines, bispropane diamines, and polyethylene glycol diamines.

4. The terminal-modified imide oligomer as claimed in claim 1, wherein said anhydride of the unsaturated dicarboxylic acid is selected from the group consisting of maleic anhydride, tetrahydrophthalic anhydride, or nadic anhydride.

5. The terminal-modified imide oligomer as claimed in claim 4, wherein said unsaturated monoamine is selected from the group consisting of aliphatic monoamines and aromatic monoamines.

6. The terminal-modified imide oligomer as claimed in claim 1, wherein said logarithmic viscosity is in the range of 0.01 to 0.8.

7. A terminal-modified imide oligomer wherein:
said oligomer is produced by reacting an aromatic tetracarboxylic acid its dianhydride, its ester or its salt containing at least 50 molar % of 3,3',4,4'-biphenyltetracarboxylic acid, its dianhydride, its ester or its salt, a diamine compound, and an unsaturated dicarboxylic acid or an unsaturated monoamine having an ethylenic or acetylenic unsaturated group or its anhydride in an organic solvent;
said diamine compound is selected from the group consisting of trialkylbenzene diamines, bis(phenoxy)benzene diamines, diphenylalkane diamines, bis(phenoxy)propane diamines, bispropane diamines, diphenylsulfone diamines, and bis(phenoxy)diphenylsulfone diamines;
said oligomer has an ethylenic or acetylenic unsaturated group as a terminal group and an internal imide bond inside of the oligomer;
said oligomer is soluble in N-methyl-2-pyrrolidone in an amount of not less than 3% by weight; and said oligomer has a logarithmic viscosity of not more than 1.0, said logarithmic viscosity being measured under the conditions of a concentration of 0.5 g/100 ml-N-methyl-2-pyrrolidone and a temperature of 30° C., and has a melting point in the range of 50° to 300° C.

8. The terminal-modified imide oligomer as claimed in claim 7, wherein said dianhydride of the aromatic tetracarboxylic acid consists essentially of 3,3',4,4'-biphenyltetracarboxylic dianhydride.

9. The terminal-modified imide oligomer as claimed in claim 7, wherein said anhydride of the unsaturated dicarboxylic acid is selected from the group consisting of maleic anhydride, tetrahydrophthalic anhydride, or nadic anhydride.

10. The terminal-modified imide oligomer as claimed in claim 7, wherein said dianhydride of the aromatic tetracarboxylic acid consists essentially of 3,3',4,4'-biphenyltetracarboxylic dianhydride.

11. The terminal-modified imide oligomer as claimed in claim 7, wherein said logarithmic viscosity is in the range of 0.01 to 0.8.

12. The terminal-modified imide oligomer as claimed in claim 7, wherein said aromatic tetracarboxylic acid or its dianhydride contains at least 70 molar % of 3,3',4,4'-biphenyltetracarboxylic acid or its dianhydride.

13. A terminal-modified imide oligomer solution composition containing the terminal-modified imide oligomer of claim 1 in a concentration of 3 to 80 wt. % homogeneously dissolved in an organic polar solvent.

14. A terminal-modified imide oligomer solution composition containing the terminal-modified imide oligomer of claim 7 in a concentration of 3 to 80 wt. % homogeneously dissolved in an organic polar solvent.

15. The terminal-modified imide oligomer solution composition as claimed in claim 13, wherein said dianhydride of the aromatic tetracarboxylic acid consists essentially of 2,3,3',4'-biphenyltetracarboxylic acid dianhydride.

16. The terminal-modified imide oligomer solution composition as claimed in claim 13, wherein said anhydride of the unsaturated dicarboxylic acid is selected from the group consisting of maleic anhydride, tetrahydrophthalic anhydride or nadic anhydride.

17. The terminal-modified imide oligomer solution composition as claimed in claim 14, wherein said dianhydride of the aromatic tetracarboxylic acid consists essentially of 3,3',4,4'-biphenyltetracarboxylic dianhydride.

18. The terminal-modified imide oligomer solution composition as claimed in claim 14, wherein said unsaturated dicarboxylic acid is selected from the group consisting of maleic anhydride, tetrahydrophthalic anhydride or nadic anhydride.

19. The terminal-modified imide oligomer solution composition as claimed in claim 14, wherein said aromatic tetracarboxylic acid or its dianhydride contains at least 70 molar % of 3,3',4,4'-biphenyltetracarboxylic acid or dianhydride.

20. The terminal-modified imide oligomer as claimed in claim 1, wherein said oligomer has the following formula (II):

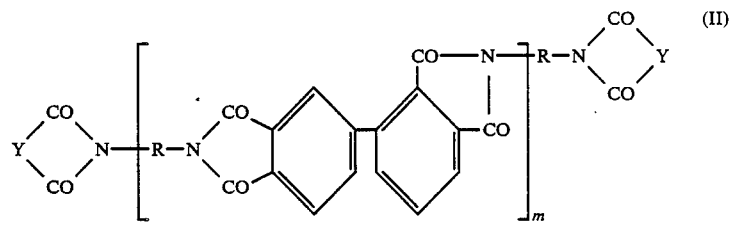

wherein Y is a group which is formed by removing the dicarboxyl group or acid monoanhydride group from a dicarboxylic acid compound having unsaturated group or an acid monoanhydride thereof, respectively; m is an integer of 1 to 80; and R is a divalent group which is formed by removing the amino group from a diamine compound.

21. The terminal-modified imide oligomer as claimed in claim 7, wherein said oligomer has the following formula (IV):

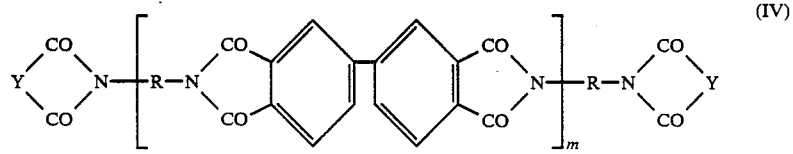

wherein Y is a group which is formed by removing the dicarboxyl group or acid monoanhydride group from a dicarboxylic acid compound having unsaturated group or an acid monoanhydride thereof, respectively; m is an integer of 1 to 80; and R is a divalent group which is formed by removing the amino group from a diamine compound.

22. The terminal-modified imide oligomer solution composition as claimed in claim 13, wherein said oligomer has the following formula (II):

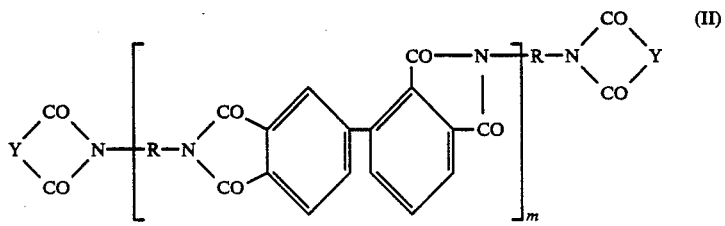

wherein Y is a group which is formed by removing the dicarboxyl group or acid monoanhydride group from a dicarboxylic acid compound having unsaturated group or an acid monoanhydride thereof, respectively; m is an integer of 1 to 80; and R is a divalent group which is formed by removing the amino group from a diamine compound.

23. The terminal-modified imide oligomer solution composition as claimed in claim 14, wherein said oligomer has the following formula (IV):

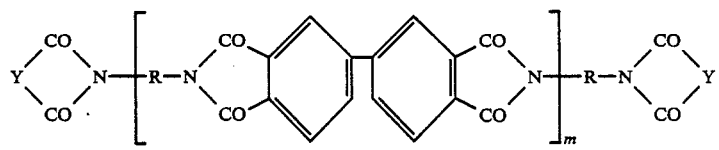

wherein Y is a group which is formed by removing the dicarboxyl group or acid monoanhydride group from a dicarboxylic acid compound having unsaturated group or an acid monoanhydride thereof, respectively; m is an integer of 1 to 80; and R is a divalent group which is formed by removing the amino group from a diamine compound.

24. A terminal-modified imide oligomer wherein:
said oligomer is produced by reacting an aromatic tetracarboxylic acid its dianhydride, its ester or its salt containing at least 50 molar % of 2,3,3',4'-biphenyltetracarboxylic acid, a diamine compound, an unsaturated monoamine in an organic solvent;
said oligomer has an ethylenically or acetifenically unsaturated group as a terminal group and an internal imide bond inside of the oligomer; said oligomer is soluble in N-methyl-2-pyrrolidone in an amount of not less than 3% by weight at 30° C.; and
said oligomer has a logarithmic viscosity of not more than 1.0, said logarithmic viscosity being measured under the conditions of a concentration of 0.5 g/100 ml N-methyl-2-pyrrolidone and a temperature of 30° C., and has a melting point in the range of 50° to 300° C.

25. The terminal-modified imide oligomer as claimed in claim 24, wherein said dianhydride of the aromatic tetracarboxylic acid consists essentially of 2,3,3',4'-biphenyltetracarboxylic acid dianhydride.

26. The terminal-modified imide oligomer as claimed in claim 24, wherein said diamine compound is selected from the group consisting of benzene diamines, toluene diamines. xylylene diamines, diphenyl ether diamines, diphenyl thioether diamines, benzophenone diamines, diphenylphosphine diamines, diphenylsulfide diamines, diphenylsulfone diamines, diphenylmethane diamines, bis(phenyl)propane diamines, bis(phenoxy)diphenylsulfone diamines, benzidines, bis(phenoxy)benzene diamines, bis(phenoxy)propane diamines, bispropane diamines, and polyethylene glycol diamines.

27. The terminal-modified imide oligomer as claimed in claim 24, wherein said logarithmic viscosity is in the range of 0.01 to 0.8.

28. A terminal-modified imide oligomer wherein:
said oligomer is produced by reacting an aromatic tetracarboxylic acid its dianhydride, its ester or its salt containing at least 50 molar % of 3,3',4,4'-biphenyltetracarboxylic acid its dianhydride, its ester or its salt, a diamine compound, and an ethyenically or acetylenically unsaturated dicarboxylic acid or its derivative or an unsaturated monoamine in an organic solvent;
said diamine compound is selected from the group consisting of trialkylbenzene diamines, bis(phenoxy)benzene diamines, diphenylalkane diamines, bis(phenoxy)propane diamines, bispropane diamines, diphenylsulfone diamines, and bis(phenoxy)diphenylsulfone diamines;
said oligomer has an unsaturated group as a terminal group and an internal imide bond inside of the oligomer;
said oligomer is soluble in N-methyl-2-pyrrolidone in an amount of not less than 3% by weight; and
said oligomer has a logarithmic viscosity of not more than 1.0, said logarithmic viscosity being measured under the conditions of a concentration of 0.5 g/100 ml-N-methyl-2-pyrrolidone and a temperature of 30° C., and has a melting point in the range of 50° to 300° C.

29. The terminal-modified imide oligomer as claimed in claim 28, wherein said unsaturated monoamine is selected from the group consisting of aliphatic monoamines and aromatic monoamines.

30. The terminal-modified imide oligomer as claimed in claim 28, wherein said logarithmic viscosity is in the range of 0.01 to 0.8.

31. The terminal-modified imide oligomer as claimed in claim 28, wherein said aromatic tetracarboxylic acid or its dianhydride contains at least 70 molar % of 3,3',4,4'-biphenyltetracarboxylic acid or its dianhydride.

32. A terminal-modified imide oligomer solution composition containing the terminal-modified imide oligomer of claim 24 in a concentration of 3 to 80 wt. % homogeneously dissolved in an organic polar solvent.

33. A terminal-modified imide oligomer solution composition containing a terminal-modified imide oligomer in a concentration of 3 to 80 wt. % homogeneously dissolved in an organic polar solvent wherein:

said oligomer is produced by reacting an aromatic tetracarboxylic acid its dianhydride, its ester or its salt containing at least 50 molar % of 3,3',4,4'-biphenyltetracarboxylic acid its dianhydride, its ester or its salt, a diamine compound, and an unsaturated monoamine in an organic solvent;

said diamine compound is selected from the group consisting of trialkylbenzene diamines, bis(phenoxy)benzene diamines, diphenylalkane diamines, bis(phenoxy)propane diamines, bis[(phenoxy)phenyl]propane diamines, diphenylsulfone diamines and bis(phenoxy)diphenylsulfone diamines;

said oligomer has an ethylenically or acetylenically unsaturated group as a terminal group and an internal imide bond inside of the oligomer;

said oligomer is soluble in N-methyl-2-pyrrolidone in an amount of not less than 3% by weight; and said oligomer has a logarithmic viscosity of not more than 1.0, said logarithmic viscosity being measured under the conditions of a concentration of 0.5 g/100 ml-N-methyl-2-pyrrolidone and a temperature of 30° C., and has a melting point of 50° to 300° C.

36. The terminal-modified imide oligomer solution composition as claimed in claim 33, wherein said dianhydride of the aromatic tetracarboxylic acid consists essentially of 3,3',4,4'-biphenyltetracarboxylic dianhydride.

37. The terminal-modified imide oligomer as claimed in claim 33, wherein said unsaturated monoamine compound is selected from the group consisting of aliphatic monoamines and aromatic monoamines.

38. The terminal-modified imide oligomer solution composition as claimed in claim 34, wherein said aromatic tetracarboxylic acid or its dianhydride contains at least 70 molar % of 3,3',4,4'-biphenyltetracarboxylic acid or its dianhydride.

39. The terminal-modified imide oligomer as claimed in claim 32, wherein said oligomer has the following formula (I):

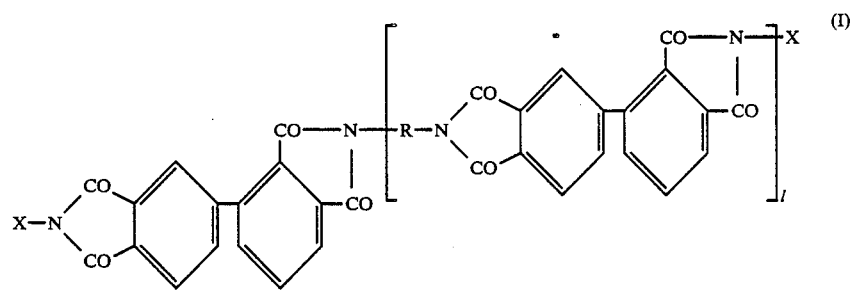

wherein X is a monovalent group which is formed by removing the amino group from a monoamine compound having an unsaturated group; l is an integer of 1 to 80; and R is a divalent group which is formed by removing the amino group from a diamine compound.

40. The terminal-modified imide oligomer as claimed in claim 33, wherein said oligomer has the following formula (III):

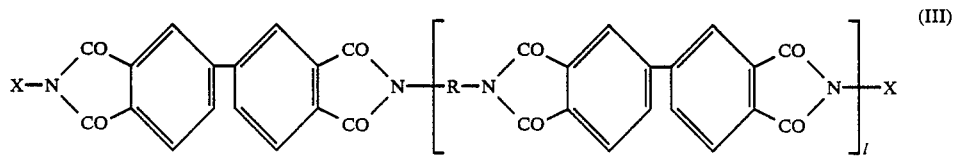

34. The terminal-modified imide oligomer solution composition as claimed in claim 32, wherein said dianhydride of the aromatic tetracarboxylic acid consists essentially of 2,3,3',4'-biphenyltetracarboxylic acid dianhydride.

35. The terminal-modified imide oligomer as claimed in claim 32, wherein said unsaturated monoamine compound is selected from the group consisting of aliphatic mono-amines and aromatic monoamines.

wherein X is a monovalent group which is formed by removing the amino group from a monoamine compound having an unsaturated group; l is an integer of 1 to 80; and R is a divalent group which is formed by removing the amino group from a diamine compound.

41. The terminal-modified imide oligomer solution composition as claimed in claim 32, wherein said oligomer has the following formula (I):

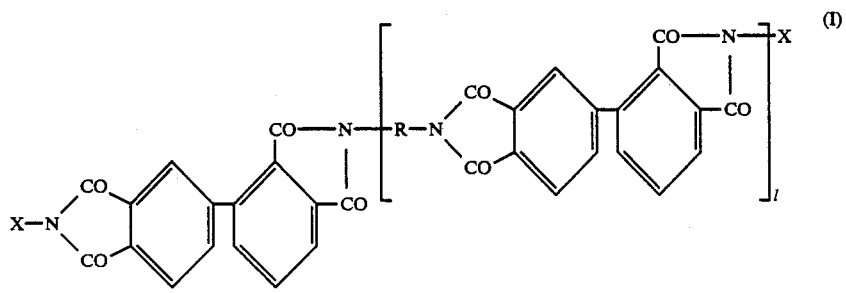

wherein X is a monovalent group which is formed by removing the amino group from a monoamine compound having an unsaturated group; l is an integer of 1 to 80; and R is a divalent group which is formed by removing the amino group from a diamine compound.

42. The terminal-modified imide oligomer solution composition as claimed in claim 33, wherein said oligomer has the following formula (III):

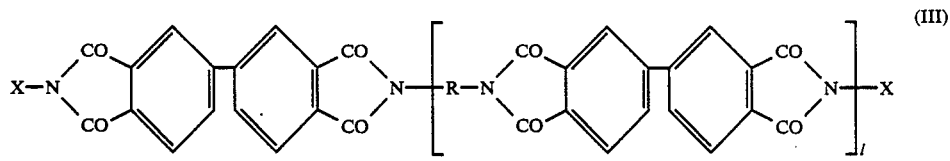

wherein X is a monovalent group which is formed by removing the amino group from a monoamine compound having an unsaturated group; l is an integer of 1 to 80; and R is a divalent group which is formed by removing the amino group from a diamine compound.

* * * * *